(12) United States Patent
Kuhn et al.

(10) Patent No.: US 7,043,653 B2
(45) Date of Patent: May 9, 2006

(54) METHOD AND APPARATUS FOR SYNCHRONOUS SIGNAL TRANSMISSION BETWEEN AT LEAST TWO LOGIC OR MEMORY COMPONENTS

(75) Inventors: Justus Kuhn, München (DE); Hermann Ruckerbauer, Moos (DE); Frank Thiele, München (DE)

(73) Assignee: Infineon Technologies AG, Munich (DE)

( * ) Notice: Subject to any disclaimer, the term of this patent is extended or adjusted under 35 U.S.C. 154(b) by 651 days.

(21) Appl. No.: 10/215,228

(22) Filed: Aug. 8, 2002

(65) Prior Publication Data

US 2003/0033551 A1 Feb. 13, 2003

(30) Foreign Application Priority Data

Aug. 8, 2001 (DE) ................................ 101 38 883

(51) Int. Cl.
*G06F 1/12* (2006.01)
(52) U.S. Cl. ...................... 713/401; 713/400; 713/503

(58) Field of Classification Search ................ 713/400, 713/401, 500, 503
See application file for complete search history.

(56) References Cited

U.S. PATENT DOCUMENTS

| 5,369,640 A | * | 11/1994 | Watson et al. ............... 714/700 |
| 5,828,871 A | | 10/1998 | Kawaguchi et al. |
| 6,085,345 A | | 7/2000 | Taylor |
| 6,629,225 B1 | * | 9/2003 | Zumkehr ..................... 711/167 |

* cited by examiner

*Primary Examiner*—Lynne H. Browne
*Assistant Examiner*—Paul Yanchus, III
(74) *Attorney, Agent, or Firm*—Laurence A. Greenberg; Werner H. Stemer; Ralph E. Locher

(57) ABSTRACT

An internal clock signal of a logic/memory component that receives signals is transmitted as a reference clock to a transmitting logic/memory component. With the aid of the reference clock, the transmission clock of the output unit of the transmitting logic/memory component is generated, such that transmitted signals arrive in a receiving unit of the receiving component synchronously with the internal clock signal of that component.

15 Claims, 2 Drawing Sheets

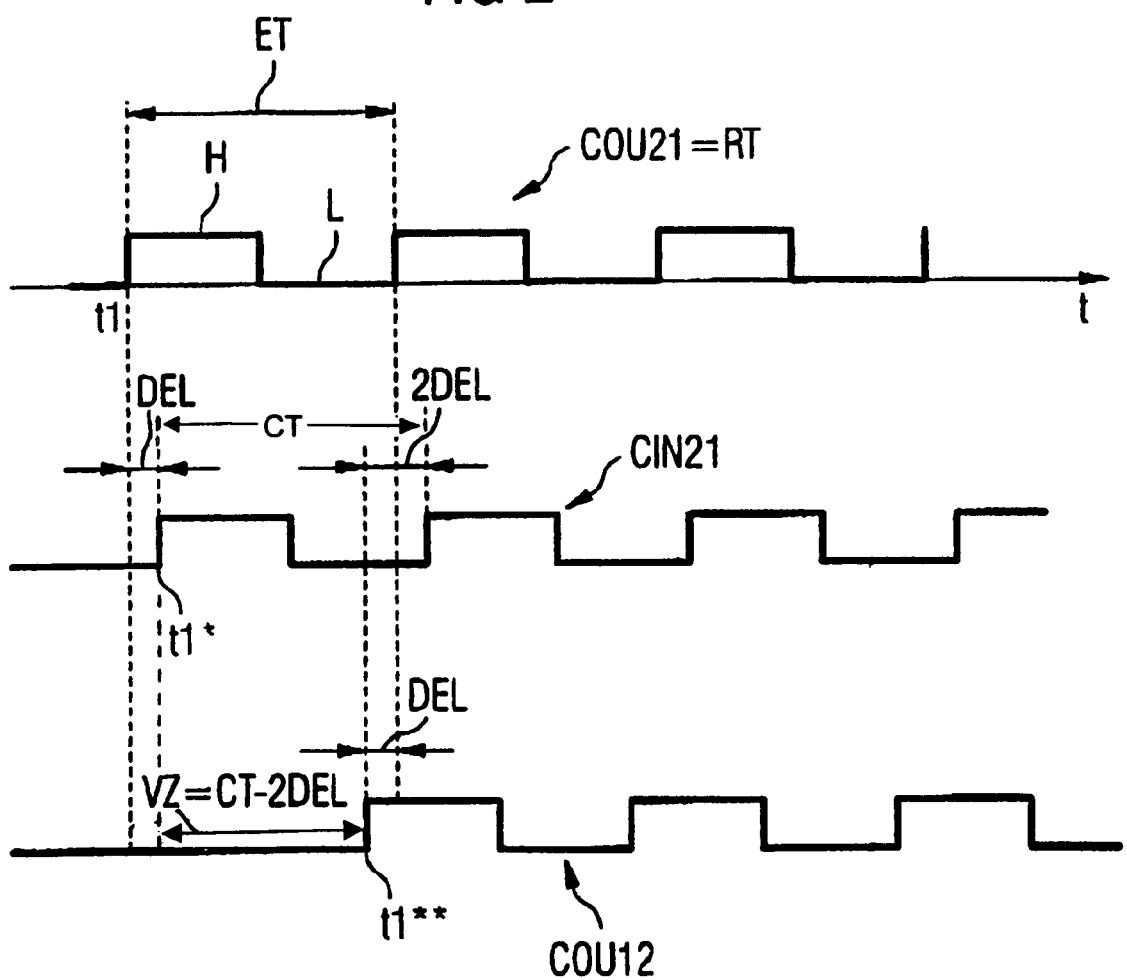

METHOD AND APPARATUS FOR SYNCHRONOUS SIGNAL TRANSMISSION BETWEEN AT LEAST TWO LOGIC OR MEMORY COMPONENTS

BACKGROUND OF THE INVENTION

Field of the Invention

The invention relates to a method and an apparatus for synchronous signal transmission between at least one first logic/memory component that transmits signals and at least one second logic/memory component that receives the signals.

Particularly in microprocessor or memory technology, message signals, such as data, addresses, commands, or other signals are transmitted among a plurality of logic/memory components. The logic/memory components usually cooperate in such a way that a first logic/memory component receives message signals from another, further logic/memory component in order to further process them and optionally transmit them on to a further logic/memory component, for instance for storage or for further signal processing, and/or to receive additional signals from the latter.

A method for synchronous signal transmission between a first logic/memory component that sends signals and a second logic/memory component that receives the signals, is described in U.S. Pat. No. 5,828,871. In the method, an internal clock signal of the second logic/memory component that receives signals is furnished as a reference clock to the transmitting first logic/memory component via at least one clock line. With the aid of the received reference clock, a transmission clock of an output unit of the transmitting first logic/memory component is generated in such a way that the signals transmitted via a signal line between the transmitting first logic/memory component and the receiving second logic/memory component are output synchronously with the reference clock.

Published, Non-Prosecuted German Patent Application DE 198 30 571 A1, describes a logic/memory component with delay units.

SUMMARY OF THE INVENTION

It is accordingly an object of the invention to provide a method and an apparatus for synchronous signal transmission between at least two logic/memory components which overcome the above-mentioned disadvantages of the prior art methods and devices of this general type, in which arriving message signals that have been sent from a first logic/memory component can be received and read out by a receiving logic/memory component essentially synchronously with its internal reception clock or its internal receiving clock.

With the foregoing and other objects in view there is provided, in accordance with the invention, a method for synchronous signal transmission between a first logic/memory component that sends signals and a second logic/memory component that receives the signals. The method includes furnishing an internal clock signal of the second logic/memory component as a reference clock. to the first logic/memory component over at least one clock line, and delaying the reference clock, arriving over the clock line, with an aid of at least one delay unit of the first logic/memory component, in such a way as to delay a starting time for each cycle of the transmission clock relative to a starting time for each cycle of the reference clock by one cycle time, minus twice a signal transit time of the reference clock, over the clock line between the first logic/memory component and the second logic/memory component. With an aid of the reference clock received and delayed, a transmission clock for an output unit of the first logic/memory component is generated in such a way that the signals transmitted over a signal line between the first logic/memory component and the second logic/memory component are output synchronously with the reference clock.

According to the invention, the internal clock signal of the signal-receiving logic/memory component is furnished as the reference clock to the transmitting logic/memory component via the clock line. With the aid of the reference clock, the transmission clock of the output unit of the transmitting component for signals to be transmitted is generated, in such a way that the signals transmitted over the signal line arrive synchronously with the internal clock signal of the receiving logic/memory component, in its receiver unit, where they are read out from it synchronously. The reference clock of the receiving second logic/memory component, arriving via the clock line, is delayed with the aid of the delay unit of the transmitting first logic/memory component, in such a way as to delay the starting time for each cycle of the transmission clock compared to the starting time for each cycle of the reference clock by one cycle time, minus twice the signal transit time of the reference clock over the clock line between the two logic/memory components.

In this way, simple and reliable synchronization between at least two logic/memory components is assured. Because the signal-receiving logic/memory component uses its internal clock signal, which actually trips the reception of the signals to be transmitted in its receiver unit, as a reference clock for the transmitting logic/memory component, and with the aid of the reference clock a corresponding transmission clock for the output unit of the transmitting component for the signals to be transmitted is generated, a high degree of synchronicity in the readout of the arriving signals relative to the internal clock signal of the receiving logic/memory component is achieved. The result is a substantial increase in the accuracy with which message signals, such as data, addresses, commands, or other signals can be transmitted between the transmitting and receiving components. Thus higher data rates in communications between the two components can be achieved, compared to conventional synchronizing processes that specify the transmission clock and the reception clock for the two components communicating with one another by a separate, external clock line for each one.

In accordance with an added mode of the invention, there is the step of reading out data, command, and address signals only unidirectionally from the first logic/memory component to the second logic/memory component over the signal line.

In accordance with an additional mode of the invention, there is the step of transmitting additional signals from the second logic/memory component to a third logic/memory component using a transmitter/receiver unit, synchronously with the internal clock signal.

In accordance with another mode of the invention, there is the step of receiving the additional signals in the third logic/memory component from the second logic/memory component using a further transmitter/receiver unit, synchronously with the internal clock signal.

In accordance with a further mode of the invention, there is the step of generating the internal clock signal of the second logic/memory component using an external clock signal.

In accordance with a further added mode of the invention, there is the step of generating the internal clock signal of the second logic/memory component using an internal clock.

In accordance with a further additional mode of the invention, there is the step of transmitting the signals, being in a form of test data, from the first logic/memory component to the second logic/memory component, synchronously with the internal clock signal. The test data is used for evaluation purposes synchronously with the internal clock signal for a signal transmission in a forward direction and/or a reverse direction between the second logic/memory component and at least one third logic/memory component.

With the foregoing and other objects in view there is provided, in accordance with the invention, in a first logic/memory component that sends signals and a second logic/memory component that receives the signals, an apparatus for synchronous signal transmission between the first logic/memory component and the second logic/memory component. The apparatus contains a clock receiver disposed in the first logic/memory component, an output unit connected to the clock receiver and disposed in the first logic/memory component, and at least one clock line connected to the clock receiver. A clock transmitter is disposed in the second logic/memory component, is connected to the clock line, and furnishes an internal clock signal as a reference clock to the clock receiver in the first logic/memory component over the clock line. A signal line is connected between the first logic/memory component and the second logic memory component. The clock receiver with an aid of the reference clock generates a transmission clock for the output unit of the first logic/memory component in such a way that the signals transmitted over the signal line between the first logic/memory component and the second logic/memory component are output synchronously with the reference clock. The clock receiver in the first logic/memory component has a delay unit to delay the reference clock arriving over the clock line from the second logic/memory component in such a way as to delay a starting time for each cycle of the transmission clock relative to a starting time for each cycle of the reference clock by one cycle time, minus twice a signal transit time of the reference clock over the clock line between the first and second logic/memory components.

In accordance with an added feature of the invention, the second logic/memory component is a chip set having an integrated processor unit.

In accordance with a concomitant feature of the invention, the first logic/memory component is a dynamic random access memory.

Other features which are considered as characteristic for the invention are set forth in the appended claims.

Although the invention is illustrated and described herein as embodied in a method and an apparatus for synchronous signal transmission between at least two logic/memory components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a timing diagram showing a chronological sequence of a clock signal in a receiving component of the configuration according to FIG. 1, and in relation to it the chronological sequence of the internal clock signal of the receiving component, which is returned there as a reference clock to a transmitting component, and the transmission clock, generated from the reference clock, for the transmitting component for synchronous transmission of message signals to the receiving component.

DESCRIPTION OF THE PREFERRED EMBODIMENTS

Figure 1:
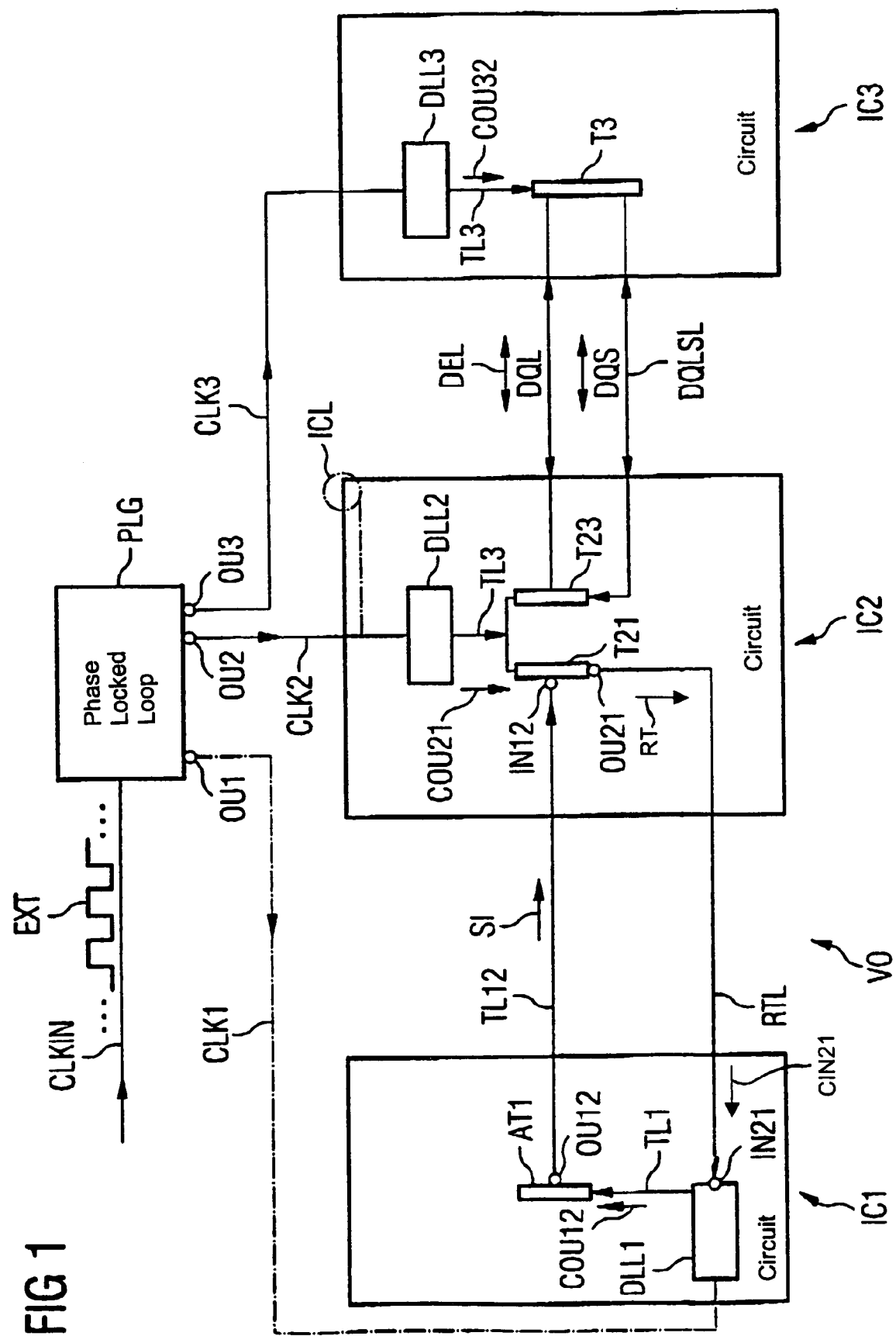
FIG. 1 is a block circuit diagram of a synchronous signal transmission among a plurality of logic/memory components with clock signaling in accordance with a method according to the invention.

In all the figures of the drawing, sub-features and integral parts that correspond to one another bear the same reference symbol in each case. Referring now to the figures of the drawing in detail and first, particularly, to FIG. 1 thereof, there is shown how for a logic/memory component, in particular an IC (integrated circuit), such as IC2, a signal transmission from and/or to further logic/memory components can be performed synchronously with an internal clock signal. In the present exemplary embodiment, message signals SI are transmitted by a first, transmitting logic/memory component IC1 to a receiving logic/memory component IC2, for further processing in the latter. Such message signals SI can for instance be data, addresses, commands, or other signals. In addition, the logic/memory component IC2 communicates with a third logic/memory component IC3. Messages signals DQ are exchanged bi-directionally between the logic/memory component IC2 and the third logic/memory component IC3 over a data line DQL; that is, the logic/memory component IC2 sends message signals to and/or receive message signals from the third logic/memory component IC3. The message signals DQ exchanged can in particular be data, addresses, commands, and other signals that are usual in microprocessor or memory technology.

In order now to enable synchronous execution, in terms of the internal clock of the logic/memory component IC2, of both arriving and outgoing message signals, the data transmission and data processing are normally synchronized by an external clock signal. In FIG. 1, one such external clock signal EXT is delivered via an external clock line CLKIN, with the aid of a phase locked loop (PLL) component group PLG, both to the logic/memory component IC2 and to the logic/memory component IC3, separately, each via its own associated data line CLK2, CLK3. If data furnishing and/or data processing that is largely synchronous with the external reference clock EXT is desired in the first logic/memory component IC1 as well, then the external reference clock EXT would be analogously distributed to it via its own external clock line CLK1 with the aid of the PLL component group PLG. The external clock line CLK1 is represented by dot-dashed lines in FIG. 1. Accordingly, the PLL component group PLG has the function of distributing the external clock signal EXT to a plurality of parallel outputs OU1, OU2 and OU3, with the clock lines CLK1, CLK2, CLK3 connected to them, so that the same external clock pattern is furnished simultaneously in each case.

The external reference clock EXT is preferably formed by the periodic succession of square voltage pulses, which succeed one another at equidistant time intervals, so that a regular, cyclical high/low bit pattern is formed. The cyclical clock pattern is additionally shown in FIG. 1 schematically for the external clock line CLKIN before it fed into the PLL component member PLG.

In the exemplary embodiment, the logic/memory component IC1 is preferably embodied as a memory chip set, optionally with an integrated processor, that serves to perform the actual data processing. In comparison, the logic/memory component IC3 forms a memory unit in particular, such as a random access memory (RAM), dynamic random access memory (DRAM), or a synchronous dynamic random access memory (SDRAM) component, or SGRAM component.

Accordingly within the context of the invention, the logic/memory component is understood to be a logic or arithmetic unit, such as a microprocessor chip, and/or a memory unit, such as a DRAM.

From the memory unit IC3, data are to be read out, and/or data DQ are to be read in from the logic component IC1. The readout and reading in is supposed to be effected synchronously with the external reference clock EXT. For a chronological adaptation of the signal or data processing in the logic component IC2 and in the reading and/or writing processes in the memory component IC3 with respect to the external reference clock EXT, the latter is delivered separately to the two components IC2, IC3 by the PLL component group PLG via the associated clock lines CLK2, CLK3. Effects on transit time caused by clock lines of different lengths, various capacitive and inductive overcouplings, various load switching among the clock lines and memory components, temperature fluctuations, process fluctuations in the production of memory and/or chips, jittering effects (that is, invariance of the chronological location of the leading edge of the high/low pattern of the external reference clock) resulting from the clock-distributing PLL member, and other interference effects can cause time lags between the reference clock patterns transmitted separately to the components IC2, IC3. In other words, a chronological divergence can occur between the external reference clock patterns at the input of the components IC2, IC3 as a result of the effects of interference. This would impair the desired synchronous data processing in the two components IC2, IC3 and the data transmission between the two components IC2, IC3 with reference to the external reference clock EXT. For this reason, each component IC2, IC3 on its input side has a so-called delayed locked loop (DLL) component, which at least with respect to the frequency or periodicity of the external clock pattern EXT largely assures synchronicity. Preferably, such a DLL component unit generates its own clock pattern, which also largely again matches, in terms of its chronological location, the chronological location of the external reference clock EXT.

In FIG. 1, the DLL component DLL2 is provided in the component IC2. At its output, via an electrical line TL3, it outputs an internal reference clock COU21, which is largely synchronous with the external reference clock EXT in terms of frequency and/or optionally phase as well. The internal reference clock COU21 is then used as a pattern or primary clock for the data processing in the component IC2 and for the data transmission and/or data reception in the component IC2.

In addition or independently of this, the internal clock signal COU21 of the second logic/memory component IC2 can optionally be generated with the aid of an internal clock ICL, which is shown in dot-dashed lines in FIG. 1 for the component IC2. Analogously, the internal clock can optionally also be furnished for the memory component IC3. The internal clock signals of the two components IC2, IC3 are expediently adapted in terms of frequency and phase to achieve the most synchronous possible clock specification.

The internal reference clock COU21 and the second logic/memory component IC2 is thus formed, corresponding to the external clock signal EXT, preferably by a periodic succession of square voltage pulses that succeed on another at equidistant time intervals, forming a regular, cyclical high/low bit pattern. One leading edge each of the high/low pattern defines a starting time for the data processing or further data transmission of the components IC2, IC3. If only the leading edges of the square pulses of the reference clock are used for defining starting times, then the term typically used is single data rate operation. In comparison, twice the operating speed in data processing can be achieved by providing that the trailing edges of the square pulses of the reference clock EXT are also used for defining starting times for data processing. This mode is known in the memory or chip industry as the double data rate processing mode.

In the component IC3 as well, a DLL delay unit DLL3 is correspondingly provided on the input side, by which an internal clock signal COU32 is furnished on the output side on a clock line TL3. The internal clock signal COU32 is synchronized in terms of its frequency with the external reference clock EXT and is made to match the chronological location of the leading pulse edges thereof. DLL units in practice, however, assure synchronicity of the externally supplied reference clock patterns only to a certain degree. Particularly, difficulties can arise in terms of the synchronicity of the phase relationships of the leading and/or trailing edges of the square pulse pattern of the particular reference clock applied to the input side on the clock lines CLK2, CLK3. This problem becomes all the more critical, the higher the demanded frequencies for data processing are, since in that case the decision times for allocating a higher low level become shorter. This increases the risk of misallocations from transit time delays. Accordingly, if even greater accuracy in terms of the synchronicity of data processing in both components IC2, IC3 is demanded, for instance because of high processing frequencies, then expediently an additional indicator signal DQS (data query strobe) is separately transmitted between the two components IC2, IC3. The indicator signal DQS travels in the respective transmission direction of the data signal to be transmitted and informs the receiving component of the exact instant of reception for the data signals DQ (data query) to be transmitted. For instance, if the data signals DQ are to be transmitted over the data line DQL from the memory component IC3 to the logic component IC2, then the data signals DQ are output into the data line DQL in the component IC3 with the aid of a driver or output unit T3, which operates in cadence with the internal reference clock COU32, in accordance with the clock times of this clock pattern. In addition, via the information line DQSL, the indicator signal DQS is transmitted, again in accordance with the internal reference clock COU32, to the logic component IC2, for the sake of unambiguously indicating to the latter component the specific instant of reception for the applicable data signal. The two transmission lines DQL, DQSL are preferably embodied as largely matching in type, length, and transmission properties. A precondition of this type of data transmission by an indicator signal is that the applicable transmitter component have a reference clock available, which is expediently also furnished to the receiving component. The message signals DQ transmitted from the memory component IC3 are received in the logic component IC2 with the aid of a driver unit T23. The driver unit T23 expediently has a receiver unit for this purpose. For bi-directional signal transmission between the two components IC2, IC3, the driver unit T23 expediently also implements a transmission function, so that data can also be transmitted in the opposite direction, from the logic component IC2 to the memory component IC3, in a corresponding way with the aid of the indicator signal DQS. The driver unit T23 is likewise clocked with the internal reference clock COU21 in terms of the instants of reception and transmission of the data signals DQ to be transmitted.

The writing or in other words transmission of data signals DQ from the second logic/memory component IC2 to the third logic/memory-component IC3 is affected individually preferably as now described.

The signals DQ, DQS are driven by the logic/memory component IC2. The applicable indicator signal DQS there is center-aligned with a respective associated data signal DQ to be transmitted, or in other words, the leading edge of the applicable indicator signal DQS comes approximately in the middle of the data window of the applicable data signal DQ. Thus the particular indicator signal DQS and the data signal DQ associated with it and to be transmitted are phase-offset from one another by 90 degrees. The logic/memory component IC3 takes over the respective arriving data signal DQ having the leading and/or trailing edge of the indicator signal DQS.

The reading of data signals DQ from the third logic/memory component IC3 to the second logic/memory component IC2 is preferably affected as now described.

The signals DQ, DQS are driven by the logic/memory component IC3. Both outgoing signals have their leading edge at the same instant; that is, there is no phase displacement but instead there is phase synchronicity. If the applicable indicator signal DQS arrives at the second logic/memory component IC2, it is phase-displaced there by 90 degrees, and only then is the value of the arriving data signal taken over. By the 90 degree phase offset performed in the logic/memory component IC2 for the indicator signal DQS, in each case the middle of the associated data window DQ, transmitted simultaneously by the memory component IC3, is indicated, and the readout of the data signal DQ is initiated.

A precondition of this type of data transmission is that the applicable transmitter component make the reference clock available. Moreover, a generation function in the applicable transmitter component for the additional indicator signal, and an evaluation function in the respective associated receiving component for the indicator signal, are required. Under some practical conditions this may be too complicated, or may not be supported by the particular logic/memory component or even implemented at all.

In order now, without this type of bi-directional transmission (by use of an additional indicator signal DQS) to be able to transmit message signals SI synchronously from at least one further, in this case the first logic/memory component IC1 to the internal reference clock COU21 of the receiving component IC2 over a data line TL12, it is now possible in the simplest case also to send the external reference clock signal EXT onward to the input of the component IC1 by the PLL member PLG over the external clock line CLK1 (shown in dot-dashed lines). The external reference clock signal EXT would then, in a manner corresponding to the other two components IC2, IC3, also be corrected by a DLL unit DLL1 analogously in terms of any possible type offset compared to the original, external reference clock pattern EXT, and finally would be transmitted over an internal clock line TL1 to a driver or transmitter unit AT1. The externally supplied reference clock pattern would then define the transmission instants for the message signals SI to be transmitted. Nevertheless, if such an external reference clock signal EXT is supplied separately and parallel to the various logic/memory components, such as IC1, IC2, IC3 for the sake of their synchronous data processing mode and/or for the data transmission, it could happen that the reference clock signal in the various components or chips involved in the data communication may look somewhat different. Such effects can be caused for instance by interference in the phase relationship, in particular jittering effects of the upstream PLL and/or DLL units. However, this would possibly excessively restrict the maximum frequency at which the circuit configuration containing the various components IC1, IC2, IC3 functions. Moreover, separately supplying the external reference clock pattern to each individual component via a separate clock line, such as CLK1, CLK2, CLK3, would compel a certain clock tree structure, which connects the individual components and in particular ICs to one another, and thus in practice might overly severely impair the freedom of choice in terms of the course of conductor tracks. Furthermore, furnishing the external reference clock signal EXT parallel in this way over separate supply lines would be all the more difficult, the higher the number of components there are that must be synchronized. This is because then the differences in the transit path because of different lengths of the supplying clock lines to the individual components would become greater and greater.

In summary, accordingly, a main IC, such as IC2, exchanges data signals with a further component, in particular an IC, such as IC3, bi-directionally and should additionally receive data, synchronously with its internal clock signal, from a further component, in particular an IC, such as IC1. The main IC IC2 is operated synchronously with a main clock, that is, an internal reference clock signal COU21. This signal is received via an external clock line CLK2, is carried internally in the component IC2 via a DLL unit, and generates the internal reference clock COU21, which assures that message signals are processed, output and/or received exactly synchronously with the external reference clock signal EXT. If the main IC IC2 is now also supposed to receive data synchronously with the internal reference clock or to the internal reference clock COU12 from the further component IC1, then the first component IC1 could transmit the data synchronously to an externally supplied main clock EXT. The component IC1 would then receive the externally supplied main clock EXT and would generate a transmission clock via a DLL unit and then send the data signals to be transmitted to the second component IC2 synchronously with the transmission clock. However, by the connection of PLL and DLL units in line with one another, differences could occur between the transmission and reception clocks, for instance from jittering effects, different phase relationships, and so forth.

These problems can now be avoided in a simple way by providing that the component IC2 that receives the message signals SI transmits its internal reference clock signal over its own data line RTL to the component IC1 that is sending the signals SI. From the reference clock signal RT returned to the transmitting component IC1, the transmission clock COU12 for the output unit, in particular the driver unit AT1, of the transmitting component IC1 for the signals SI to be transmitted is generated, in such a way that the signals SI transmitted over the signal line TL12 arrive synchronously with the internal clock signal COU21 of the receiving component IC2 in its receiver unit T21 and are read out synchronously by the latter. That is, if the reception clock of the receiving component IC2 is transmitted to the transmitter component IC1, then the transmitter component IC1 can synchronize to that clock, that is, to the reference clock with which the receiving component IC2 receives the data or message signals to be transmitted. Thus any interference or errors and in particular phase offsets, which can occur because of the connection of various PLL and/or DLL units in line with one another, are largely avoided.

If only the external reference clock were supplied to each component, then a time lag or delay of +100 psec could be slipped into the component IC2 compared to the clock pattern of the external reference clock EXT, for instance, while via the external clock line CLK1, compared to the external reference clock EXT, a time lag of −100 psec would be caused by the delay member DLL1. The overall result between the internal clock signals or clocks of the first component IC1 and second component IC2, a time offset of 200 psec, which is twice as long as the total chronological error or relative offset, would result, so that any synchronization of the two components IC1, IC2 to one another would largely be lost. In comparison, by the feedback of the internal clock signal of the receiving component IC2 to the transmitter component IC1 and its use there as a reference clock, it is avoided from the very outset that any time lag, such as 100 psec in this case, could be slipped in by the delay member DLL2 of the component IC2 and have an effect on the relative chronological position of the internal clock signals of the two components IC1, IC2 to one another. Thus in this example, only an offset or error of 100 psec between the two internal clock signals of the components IC1, IC2 could result because of the delay member DLL1.

The logic/memory component IC1 to which the internal clock signal COU21 of the receiving component IC2 is supplied as a reference clock RT can in particular be formed by an external device, such as an oscillator scope), function generator, bit error rate tester, or other testing device. This device can, by forwarding the internal clock signal of the receiving component, furnish message signals, such as data, commands, addresses, and so forth, largely synchronously, or in other words at the instants of reception, which are fixed in a defined way, of the receiving component, to the input thereof, which makes the testing of such complicated components as in this case a chip set 1C2 and its cooperation with other components, as in this case an SDRAM memory 1C3, easier.

By outputting the internal clock signal of the receiving component, which actually trips the reception of the signals to be transmitted, and whose further use as a transmission clock for the data output of a second component, substantially higher precision is attained, with which data can be transmitted between two components, while at the same time the complication and expense are reduced compared to existing data transmission methods, such as those using an additional indicator signal. Thus higher data rates in communication among a plurality of components can be achieved. Instead of an external reference signal that is brought to each individual component via a single PLL member, the receiving component now makes its reception clock available, which is used by the transmitter component as its basic clock. The data, or signals, to be transmitted are thus sent synchronously to the reference clock of the receiving component. At the same time, a complicated, expensive tree structure of externally supplied clock lines is avoided.

In the transmitting logic/memory component IC1, the reference clock RT of the receiving component IC2, which is arriving over the clock signal line RTL. is expediently delayed in such a way, with the aid of at least one delay unit, in particular a DLL member DLL1, that the periodic clock pattern of the transmission clock COU12 at the output of the DLL member DLL1 in the component IC1 lags one cycle time behind, reduced by twice the signal transit time for the transit paths along the two data lines RTL, TL12, compared to the clock pattern of the reference rate in the receiving component IC2. The reference clock RT carried to the transmitting component IC1 is thus modified in the transmitter component IC1 such that the signal SI to be transmitted at defined reception times of the internal reference clock COU21 of the receiving component IC2 arrive in the receiver unit T21 thereof. The receptions times can be formed for instance by the leading edges of the periodic square high/low clock pattern of the internal reference clock.

FIG. 2, using clock patterns in the receiving component IC2 and the transmitting component IC1, shows how the transmission clock can be fittingly generated in the transmitting component IC1 from the transmitted reference clock RT on the reception side, in such a way that the signals SI to be transmitted arrive as exactly as possible at the specified, defined receiving times in the receiving component IC2. In the upper half of the drawing, a time t is plotted along the abscissa. Along the ordinate, a periodic high/low clock pattern of square voltage pulses is shown, which succeed one another at equidistant time intervals. The higher levels H define a first state, such as a Boolean logical 1, while the lower level states L define a second state, such as a logical 0. The clock pattern thus formed can be used for instance for the internal reference clock COU21 in the receiving component IC2. A cycle time CT of the periodic clock pattern is preferably determined by two successive leading edges of two adjacent square pulses H. If the internal clock pattern of the receiving component IC2 is now transmitted as a reference clock RT to the transmitting component IC1 over a clock line RTL, then a transit time delay DEL can occur because of the line length of RTL, capacitive and/or inductive overcouplings, capacitive load switching of the clock transmitter, and other interference factors. In the transmitting component IC1, the reference clock CIN21 thus arrives with a time lag DEL compared to the originally sent reference clock RT that is present at the output of the receiving component IC2. A starting time t1* of each square pulse is accordingly shifted, in the reference clock signal CIN21 received by the transmitter IC1, by the delay time DEL compared to a starting time t1 of the reference clock COU21 originally furnished by the receiving component IC2. Since the signal line TL12 is essentially equivalent, in the opposite direction for the signals SI to be transmitted, to the clock line RTL in terms of its transit path, its wiring, and other properties, a corresponding time lag DEL is brought about upon a signal transmission over the signal line TL12. Taking the transit time delay DEL into account, in the transmitting component IC1 with the aid of the DLL member DLL1 or some other logic circuit or other function, the transmission clock COU12 is generated in such a way that compared to the reference clock COU21 originally furnished by the receiving component IC2, it is earlier by the amount of the delay time DEL; that is, the starting time t1 of the transmission clock COU12 in the transmitting component IC1 is chronologically earlier than the starting time t1 of each square pulse of the originally furnished reference clock COU21 on the reception side. The reference clock CIN21 arriving at the transmitting component IC1 is to that end delayed in the transmitting component IC1 such that the transmission clock COU12 for the output driver AT1 for each clock cycle follows later by one cycle time, minus twice the transit time delay 2DEL. The starting time t1 of the first square pulse of the transmission clock COU12 is accordingly shifted chronologically by the cycle time CT, minus twice the transit time difference 2DEL, that is, VZ=CT−2DEL, compared to the starting time t1* of the first square pulse H of the reference clock pattern CIN21. The transmission clock pattern COU12 is thus shifted earlier, compared to the reception clock pattern COU21, by a single transit time lag DEL for the signal transit time over the signal line TL12. The transmission clock COU12 then defines the clocking or triggering for the outputting of the signals SI to be transmitted. If for instance the leading edge of each square pulse of the transmission clock COU12 is used as the transmission time for signals SI to be sent, then the signals largely arrive exactly at the defined reception times, namely at the instant of a leading edge of the original reference clock COU21 in the receiving component IC2. Synchronous data processing between the two components IC1, IC2 is thus assured in both a simpler and a more-reliable manner.

In summary, in the exemplary embodiment of FIG. 1, the common external clock signal EXT for the two components IC2, IC3 communicating bi-directionally with one another is used, which at DDR (double data rate) is a conventional method. Addresses and commands are synchronized to the clock signal. In the data transmission, a DQS signal is used as the reference signal or indicator signal. The reference signals for the bi-directional data transmission between the two components IC2, IC3 always travel in the same direction as the data signals to be transmitted. If data are now to be received from a further, third component by the component IC2 synchronously with its internal main clock signal, then to that end the internal reference clock is transmitted to the further transmitting component IC1. From the reference clock RT received from the receiving component IC2, the transmitting component IC1 generates a transmission clock fittingly, such that the data to be transmitted arrive in the receiving component synchronously with the reception times of the internal reference clock of that component. A synchronous system can thus be constructed, which receives data at a fixedly defined, single rate. This makes data transmission by the pipeline method among a plurality of components or component groups possible. For instance, data from a first memory component, such as the IC1, can be read out, delivered at the same rate to a second logic component, and further processed in this latter component. At the same time, at the same clock rhythm, additional data can be sent from the logic component IC2 to at least the third component IC3 or received by that component. The second component thus outputs data, further processed at the same internal clock rhythm, to at least one third component or receives additional data from that component. In this way, any errors or interference in terms of the clocking in the various components resulting from different DLL and PLL parameters are largely avoided.

Expediently, the various component groups or components communicating with one another can be combined with some or all of them on a single printed circuit board or in a single IC.

We claim:

1. A method for synchronous signal transmission between a first component that sends signals and a second component that receives the signals, which comprises the steps of:

furnishing an internal clock signal of the second component as a reference clock to the first component over at least one clock line;

delaying the reference clock, arriving over the clock line, with an aid of at least one delay unit of the first component, in such a way as to delay a starting time for each cycle of the transmission clock relative to a starting time for each cycle of the reference clock by one cycle time, minus twice a signal transit time of the reference clock, over the clock line between the first component and the second component; and generating, with an aid of the reference clock received and delayed, a transmission clock for an output unit of the first component in such a way that the signals transmitted over a signal line between the first component and the second component are output synchronously with the reference clock.

2. The method according to claim 1, which comprises reading out data, command, and address signals only uni-directionally from the first component to the second component over the signal line.

3. The method according to claim 1, which comprises transmitting additional signals from the second component to a third component using a transmitter/receiver unit, synchronously with the internal clock signal.

4. The method according to claim 3, which comprises receiving the additional signals in the third component from the second component using a further transmitter/receiver unit, synchronously with the internal clock signal.

5. The method according to claim 1, which comprises generating the internal clock signal of the second component using an external clock signal.

6. The method according to claim 1, which comprises generating the internal clock signal of the second component using an internal clock.

7. The method according to claim 1, which comprises transmitting the signals, being in a form of test data, from the first component to the second component, synchronously with the internal clock signal, the test data being used for evaluation purposes synchronously with the internal clock signal for a signal transmission in at least one of a forward direction and a reverse direction between the second component and at least one third component.

8. In a first component that sends signals and a second component that receives the signals, an apparatus for synchronous signal transmission between the first component and the second component, the apparatus comprising:

a clock receiver disposed in the first component;

an output unit connected to said clock receiver and disposed in the first component;

at least one clock line connected to said clock receiver;

a clock transmitter disposed in the second component, connected to said clock line, and furnishing an internal clock signal as a reference clock to said clock receiver in the first component over said clock line; and a signal line connected between the first component and the second component, said clock receiver with an aid of the reference clock generates a transmission clock for said output unit of the first component in such a way that the signals transmitted over said signal line between the first component and the second component being output synchronously with the reference clock;

said clock receiver in the first component having a delay unit to delay the reference clock arriving over said clock line from the second component in such a way as to delay a starting time for each cycle of the transmission clock relative to a starting time for each cycle of the reference clock by one cycle time, minus twice a signal transit time of the reference clock over said clock line between the first and second components.

9. The apparatus according to claim 8, wherein the second component is a chip set having an integrated processor unit.

10. The apparatus according to claim 8, wherein the first component is a dynamic random access memory.

11. A circuit having synchronous signal transmissions, comprising:

a first component having a clock receiver and an output unit connected to said clock receiver;

at least one clock line connected to said clock receiver;

a second component having a clock transmitter connected to said clock line and furnishing an internal clock signal as a reference clock to said clock receiver in said first component over said clock line; and a signal line connected between said first component and said second component, said clock receiver with an aid of the reference clock generates a transmission clock for said output unit of said first component in such a way that the signals transmitted over said signal line between said first component and said second component being output synchronously with the reference clock;

said clock receiver in said first component having a delay unit to delay the reference clock arriving over said clock line from said second component in such a way as to delay a starting time for each cycle of the transmission clock relative to a starting time for each cycle of the reference clock by one cycle time, minus twice a signal transit time of the reference clock over said clock line between said first and second components.

12. The apparatus according to claim 11, wherein said second component is a chip set having an integrated processor unit.

13. The apparatus according to claim 11, wherein said first component is a dynamic random access memory.

14. The apparatus according to claim 11, wherein:

said first component is selected from the group consisting of memory components and logic components; and said second component is selected from the group consisting of memory components and logic components.

15. The method according to claim 1, which comprises:

selecting the first component from the group consisting of memory components and logic components; and selecting the second component from the group consisting of memory components and logic components.

\* \* \* \* \*